United States Patent [19]

Bains et al.

[11] Patent Number: 5,579,222

[45] Date of Patent: Nov. 26, 1996

[54] DISTRIBUTED LICENSE ADMINISTRATION SYSTEM USING A LOCAL POLICY SERVER TO COMMUNICATE WITH A LICENSE SERVER AND CONTROL EXECUTION OF COMPUTER PROGRAMS

[75] Inventors: Jeffrey E. Bains; Willard W. Case, both of Madison, Ala.

[73] Assignee: Intergraph Corporation, Huntsville, Ala.

[21] Appl. No.: 990,583

[22] Filed: Dec. 14, 1992

Related U.S. Application Data

[63] Continuation-in-part of Ser. No. 798,934, Nov. 27, 1991.

[51] Int. Cl.$^6$ ............................ G06F 15/16; G06F 17/60
[52] U.S. Cl. ...................... 395/712; 395/216; 395/226; 395/201
[58] Field of Search ............................. 395/600, 200, 395/700; 380/4, 25; 364/401

[56] References Cited

U.S. PATENT DOCUMENTS

| | | | |
|---|---|---|---|
| 4,713,753 | 12/1987 | Boebert et al. | 395/491 |
| 4,791,565 | 12/1988 | Dunham et al. | 395/186 |
| 4,924,378 | 5/1990 | Hershey et al. | 395/187.01 |
| 4,937,863 | 6/1990 | Robert et al. | 380/4 |
| 5,204,897 | 4/1993 | Wyman | 380/4 |
| 5,260,999 | 11/1993 | Wyman | 380/4 |
| 5,343,526 | 8/1994 | Lassers | 380/4 |
| 5,390,297 | 2/1995 | Barber et al. | 395/700 |

OTHER PUBLICATIONS

Olson et al, "Concurrent Access Licensing," Unix Review vol. 6, No. 9, Sep. 1988, pp. 67–74.

Primary Examiner—Thomas G. Black
Assistant Examiner—Jack M. Choules
Attorney, Agent, or Firm—Bromberg & Sunstein

[57] ABSTRACT

An improved system for administration of license terms for a software product on the network, having an arrangement, for tracking software product usage, with one of the computers acting as a license server. This arrangement permits the license server (i) to identify the current set of nodes that are using the software product, (ii) to handle license data concerning conditions under which usage of the software product is permitted at any given node, and (iii) to determine whether at any given time the conditions would be satisfied if a given node is added to this set of nodes. The software product may thus include instructions to interface with the license server to cause enforcement of the license terms. The improvement, in one embodiment, to the system includes a policy server database maintained on each node, containing data specifying conditions under which usage of the software product is permitted on the corresponding node. Each node also has a policy server "daemon" in association with the corresponding policy server database, for (i) communicating with the license server, (ii) interfacing with both the software product and the corresponding policy server database, (iii) enforcing the license terms applicable to the software product at a given local node on the basis of both license policy maintained at the local node as well as applicable data from the license server.

18 Claims, 9 Drawing Sheets

DISTRIBUTED LICENSE ADMINISTRATION SYSTEM USING A LOCAL POLICY SERVER TO COMMUNICATE WITH A LICENSE SERVER AND CONTROL EXECUTION OF COMPUTER PROGRAMS

This application is a continuation-in-part of U.S. application Ser. No. 07/798,934, filed Nov. 27, 1991, which is hereby incorporated herein by reference.

TECHNICAL FIELD

The present invention relates to systems and methods for controlling and monitoring the use, on computers and computer networks, of computer programs.

BACKGROUND ART

As computers have proliferated in availability, the investment in computer software has also grown, and there have been developed various methods for charging the computer user for use of computer software products. Typically computer software products are licensed, rather than sold, to the computer user under various arrangements. The simplest common license arrangement gives the user the right to use a software product on a single computer, i.e., to employ only one central processing unit (CPU) in connection with operation of the software product. Although many such licenses are for indefinite periods of time, a license may also be for a limited duration and extendable, so that the entity marketing the product can charge a periodic fee (for example, annually) for use of the software product. Or use may be absolutely time-limited (for example, one-day), so that the user may evaluate the software product for possible purchase of a regular license.

Since software can be copied and moved easily from one like machine to another, companies have invented methods to prevent unauthorized use of their software products. Some licensors require passwords to activate software on a particular machine. The password may be keyed to the hardware's identification number as a condition for operation of the software. Such systems can effectively lock software to a particular machine, but do not address software that is licensed for concurrent or simultaneous use. Some licensors use hardware locks that attach to a parallel printer port or a serial port on a machine; each time the software is activated, it looks for a specified code, in the hardware lock, as a condition for operation of the software. Using hardware locks resolves the problem of unauthorized moving of software among machines; however, hardware locks do not handle multiple software products on a single machine, and they require time and expense to deliver to the end user.

When computer software products are used in a network environment (which may include computers running in various roles as workstations and servers of various types linked together over a data path), additional licensing challenges are present. For example, a network may permit a user at one node (which may be a terminal or workstation, for instance) to utilize a software product running at another node (which may be the network server or even another workstation). Consequently, the terms of the single-computer type of software license might not cover the usage of the software product on the network, or worse still (from the point of view of the licensor) might actually permit such a usage without additional compensation to the licensor. One approach to network licensing is to grant permission to use the program based on all of the nodes on the network, and to require a license for each node. Then typically the license fee may be increased as the number of nodes on the network increases. Another approach bases the license fee for a software product running on a network on the total number of individual users who might actually run the software, regardless of the number of nodes either on the network or running the software product at a given time. These approaches, however, have usually required the cooperation of the licensee, because additional nodes may be added to the network, or additional users may utilize the software, without the knowledge of the licensor, who is typically not present on the premises of the licensee. The licensor may reserve the right to audit the licensee's site, but such an audit is intrusive, expensive, and may alienate potential or actual customers for licenses. Although other approaches exist under which one might charge a single fee per server or per site or per entity, often on an individually negotiated basis, these approaches are often impractical or inflexible, in that they also typically do not take into account the possible wide variation over time in the number of nodes or users and also require reliance on licensee cooperation.

The same circumstances that make license enforcement difficult for the licensors of software products for a network environment also make license compliance difficult for the conscientious administrator, for example, of a Management Information System (MIS) or Computer Aided Design (CAD) department of a company using software products. The administrator may be called upon to ensure that the number of workstations using a variety of software products in a network environment complies with the terms of a variety of license agreements. Such an administrator may have to develop and promulgate a series of directives about the terms of permitted workstation usage and must depend primarily upon the goodwill and voluntary compliance of unit personnel with such directives.

Recently it has become practical in some network environments to determine and limit the number of nodes that may access a software product at a given time, and to charge a license fee based on the maximum number of nodes that are permitted to use the software product concurrently. This is called "concurrent licensing". In these environments, a computer program, acting as "librarian" and running on a computer node designated as a license server, is typically used to distribute license keys (sometimes called "tokens") over the network to nodes requesting access to run a software product; the number of keys is tracked by the librarian; and if at a given time, the permitted maximum number of keys would be exceeded by usage of the software product on a requesting node, the node can be denied, at such time, access to invoke the software product.

Examples of software-based concurrent licensing arrangements may be found in Unix applications running in connection with software products sold under the trademarks NetLS (available from Gradient Technologies, Inc., 577 Main Street, Suite 4, Hudson, Mass. 01749), and SunLic (available from Sun Microsystems, Inc., Mountain View, Calif.), and Flexible License Manager (available from Highland Software, Inc., 1001 Elwell Court, Palo Alto, Calif. 94303). However these arrangements suffer from a number of disadvantages. NetLS, for example, includes mechanisms for tracking which nodes have been given keys to run a given software product and the number of keys available for running such software product. However, it is up to the designers of each software product to program such product to implement the terms of any license agreement, and, in particular, to program into the product calls to the NetLS software to provide information to the computer running the software product and to write code in the applicable product to prevent use of the product when the license terms have not been obeyed. Thus a computer system utilizing ten different software products that rely on NetLS for license enforcement will generally have ten different substantial software portions (one in each computer product) to achieve license enforcement. In addition to this complexity, if the license server running NetLS fails, of if the network itself fails, then a workstation loaded with the software product cannot run the software product, since the product requires NetLS interaction to be activated.

The foregoing difficulties are applicable generally not just to NetLS but to "metering software" generally. The Microcomputer Managers Association has issued a White Paper (Oct 2, 1991), reprinted in Infoworld, pages 46–42 (Oct. 14, 1991) on the problems of network licensing, Commenting on the problem that each software product requires its own interface to the metering software (as well as possible input of administrative information), the White Paper suggests that "[i]t makes much more sense to have a single package provide the metering for all application software on the network." Infoworld (Oct. 14, 1991), supra, at page 51, column 4. Such an approach has its own difficulty, however. Each application would still have to interface with the single metering package, and the interface to such a package must somehow deal with the varying licensing terms of each software product. Moreover, with the metering package running on the license server, a failure of the server or the network would prevent all software applications from running anywhere on the network.

SUMMARY OF THE INVENTION

In a preferred embodiment, the present invention provides an improved system for administration, on a computer network, of license terms for a software product on the network. The improved system is of the type having an arrangement, such as NetLS, for tracking software product usage, associated with one of the computers acting as a license server. This arrangement permits the license server (i) to identify the current set of nodes that are using the software product at a given time, (ii) to handle license data concerning conditions under which usage of the software product is permitted at any given node, and (iii) to determine whether at any given time the conditions would still be satisfied if a given node is then added to this set of nodes. The software product may thus include instructions to interface with the license server to cause enforcement of the license terms. The improvement, in one embodiment, to the system includes a policy server database maintained on each node, containing data specifying conditions under which usage of the software product is permitted on such node. Each node also has a policy server "daemon" (which may be implemented in software) in association with the corresponding policy server database, for (i) communicating with the license server, (ii) interfacing with both the software product and the corresponding policy server database, (iii) making a permission-to-run availability determination, with respect to local usage of the software product, on the basis of applicable data from the license server and the corresponding policy server database, so that enforcement of license terms applicable to the software product at a given local node is achieved on the basis of both license policy maintained at such local node as well as applicable data from the license server.

In a further embodiment, each policy server database contains data specifying conditions under which usage of each of a plurality of software products is permitted on the node on which the database is maintained. Additionally, each policy server daemon interfaces with each software product. In this manner, enforcement of license terms applicable to each software product at a given node is achieved on the basis of both locally maintained license policy and applicable data from the license server.

In a further embodiment, each node has a log file maintained, in association with each policy server daemon, to record recent software product usage on that node. The policy server daemon is accordingly configured to handle instances when data from the license server is unavailable—for example, when the computer acting as the license server is non-operational or when the network is non-operational. In particular, the policy server daemon may permit a node to run a software product, in the absence of license server data, if the node's log file indicates a sufficient level of recent usage of the software product on the node. The circumstances under which such a permission-to-run availability determination is favorable may be established by the node's policy server database.

In yet further embodiments, the policy server database and the log file may be encrypted. Furthermore the interface between the policy server daemon and each software product may be made secure. When one or more of the software products are subject to concurrent licensing restrictions specified in the policy server databases, the policy server daemon may be permitted to reserve a predetermined time interval over which the applicable node has a guaranteed opportunity to utilize a given software product. The reservation is accomplished by having the node's policy server daemon communicate to the license server over the predetermined time interval that the node is using the given software product, regardless whether the software product is actually being used.

It can be seen that the present invention permits a single database at each node to specify all of the conditions under which the node may access any of the software products on the network. Furthermore, as described in further detail below, in order to invoke the licensing administration function carried out in accordance with the present invention, each software product need contain only a simple and short segment including the instruction:

ILic-get_license followed by parameters identifying license details for the particular software product. A branching routine (which may made available to all the software products, and called by the particular software product after this instruction) then specifies program flow depending on whether a license is available (the remainder of the program can be run) or not (the program operation is terminated and a message is displayed to the user).

BRIEF DESCRIPTION OF THE DRAWINGS

The foregoing features of the invention will be more readily understood by reference to the following description taken with the accompanying drawings in which.

DETAILED DESCRIPTION OF SPECIFIC EMBODIMENTS

The invention is applicable to computer networks of the type having an arrangement, such as NetLS, for tracking software product usage, associated with one of the computers on the network acting as a license server. The present embodiment is described with respect to a Unix network; however, the software used by the license server in implementing such an arrangement, and the particular network type, are a matter of design choice.

Figure 1:
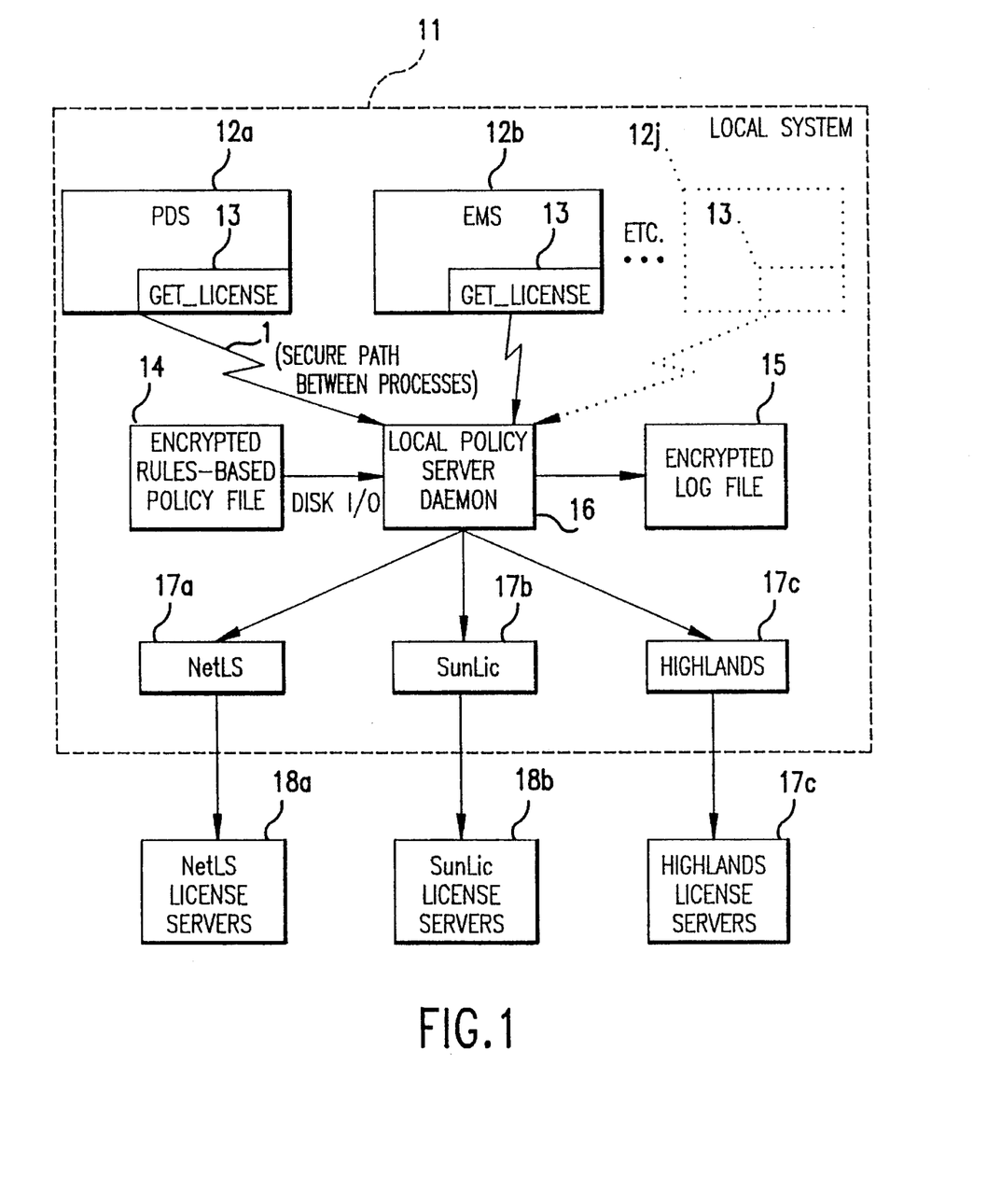
FIG. 1 is a block diagram showing operation of a preferred embodiment of the invention in a network.

FIG. 1 shows the manner in which a preferred embodiment of the invention may be implemented on a Unix network. Each computer node 11 of the network may be running a variety of software products, such as PDS (item 12a), EMS (item 12b), and so forth (shown through item 12j). Each of these products includes a call "get_license" to the local policy server daemon 16 for a determination whether a license is available to run the product in question. As used in this detailed description, the term "license" refers not to a written document between the licensor and the licensee, but rather to the availability of permission to run the software product. The local policy server daemon 16 operates at the computer node 11 and makes the permission-to-run availability determination by reference to its associated policy server database 14, also located at the node, to identify the rules specifying the circumstances under which a license would be granted. The daemon 16 also communicates over the network with the applicable license server. In this figure, three separate license servers are shown: one (item 18a) running NetLS; another (item 18b), SunLic; and another (item 18c), Highlands. The license server communicates with the daemon 16 using the applicable license software NetLS (item 17a), SunLic (item 17b), or Highlands (item 17c), and informs the daemon whether usage of the software product on the network is such that a license may be granted in accordance with the policy established by the database 14. If so, the daemon 16 reports the license to the applicable software product 12, and to the applicable license server 18. If there is no successful communication with the applicable license server 18, if the database 14 so permits, the daemon 16 will consult a log file 15 recording instances of recent software product usage, and if there has been a sufficient level of recent software product usage that has been licensed, the daemon will grant a temporary user license (TUL) to run the software product.

The communication between the applicable software product 12 and the local policy server daemon 16 is handled as an interprocess communication in Unix. Here the Unix "message" is used as the means of communication, but this is a matter of choice, and other means of communication, such as pipes or shared memories, may be used. In order to reduce to risk of tampering by the licensee with the license availability determination made by the policy server daemon 16, the rules database 14 and the log file 15 may be encrypted using techniques known in the art. Similarly, the message communication from the application to the policy server daemon 16 can be subject to validation using techniques known in the art to assure that the message is indeed from the pertinent software product.

The embodiment described herein has been implemented for use with a variety of types of licenses. (Numerous license types may be created and enforced by the invention, but the following types are illustrative.) One type is the concurrent use license. A concurrent use license is issued, from the server running the Licensing System (sometimes called the "license server" in this description and the claims following), with respect to a software product being used on a node in a network. The license server controls the levels of concurrent usage of the software product. Concurrent use licenses are returned to the license server when they are no longer needed. For example, if the Licensing System on the server permits five concurrent licenses for a given software product, then five users on the network can run the software product concurrently.

The concurrent use license is actually implemented as part of a two-tier structure. The first tier is a "base license," and the second tier is a "version-specific" license. The base license controls the number of simultaneous users of a software product. The version license controls the version of the software product that may be utilized by the user. The base license typically expires at the end of each year, and may be renewed. The version license typically never expires. The version license provides a mechanism for controlling how many base licenses are for a software product that is under a maintenance agreement. As an example, a user may have purchased a license to five copies of version A of a software product, but kept maintenance on only three copies. In such a case the user would receive five base licenses (which expire each year and were replenished unless the applicable computers were sold), plus five version A licenses that never expire. This user would subsequently receive only three version B licenses for the three copies under maintenance. Under such an arrangement, the user could still run five copies of version A of the software product, or a mix of version A and version B software as long as the mix does not exceed five copies in total and does not exceed three copies of version B.

The policy server database file 14 of a computer node stores the license requirements for each software product to be run at that node. For each software product, the database may identify the number of base license "tokens" and version license "tokens" obtained from the server running the Licensing System, that are necessary for operation of that software product on the particular computer consituting the node. (The particular computer, for example, may be particularly fast in processing, and therefore a higher license fee may be required for running the software product on such computer, resulting here in a larger number of tokens required for the base and version licenses.)

Another type of license is a node-locked license, which is tied to a particular computer node and cannot be used by other nodes. The node-locked license token is designated for a particular node when created. In a further variation of the node-locked license, a "reserved" license may be established, that is, the policy server daemon may be permitted to reserve a predetermined time interval over which the applicable node has a guaranteed opportunity to utilize a given software product. (The reservation is accomplished by having the node's policy server daemon communicate to the license server over the predetermined time interval that the node is using the given software product, regardless whether the software product is actually being used.)

A single use license can be used only for one invocation of the software product. Single use licenses are useful for emergency situations, peaks in usage, or demonstrations. A day use license is similar to a single use license, except that a day use license remains available on the computer node that acquired it for 24 hours after the time of acquisition.

A temporary user license (TUL), described above, is issued on a temporary basis when the server running the Licensing System becomes unavailable. A TUL is designed for emergency situations and is grated on a per user, per node, per software product, per usage history basis.

Figure 2:
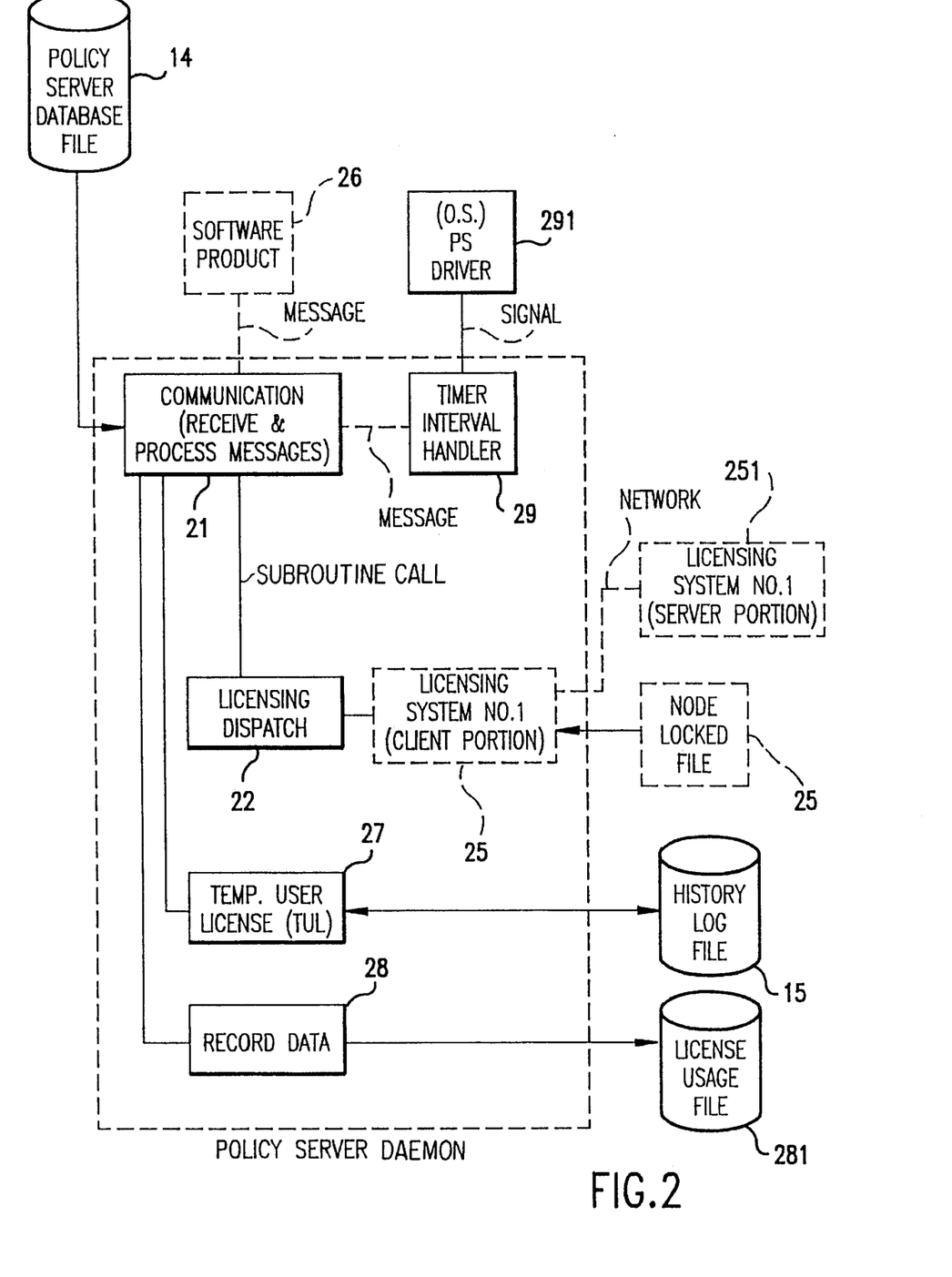
FIG. 2 is a block diagram illustrating the interrelation of important modules of the embodiment.

FIG. 2 illustrates the structure of a program implementing the embodiment of FIG. 1 for a single license server running one or more Licensing Systems, such as NetLS. The program is written in standard C. A communication module 21 handles communication with the various software products, one of which is here shown as item 26. If the software product includes the "get_license" instruction, the communication module 21 refers to the licensing dispatch module 22. The licensing dispatch module 22, by reference to the policy server database 14 and the applicable Licensing System, makes the license availability determination. The Licensing System shown here is No. 1, and client portion 25 is accessed by licensing dispatch 22, which may access other Licensing Systems depending on the software product 26 and information in the policy server database file 14. The client portion of the Licensing System 25 communicates over the network with the server portion 251. In the event that there is no successful communication with the server portion 26, the communication module may trigger the temporary user license (TUL) module 27 to consult with the history log file 15 to determine if there is a sufficient level of recent licensed usage of the software product at this node to permit the grant of a temporary user license (TUL). In any event, the communication module 21 reports the license availability determination by directing a message to the software product's process. The communication module is also responsible for sending a periodic signal (a "ping") to the license server to indicate continued use of a license. Another module 28 causes recordation of license usage in license usage file 281 for reporting purposes. A file 252 of node-locked licenses is maintained locally. The communication module 21 is controlled by timer interval handler 29, which in turn receives periodic signals from PS driver 291 that has been incorporated into the operating system.

Figure 3:
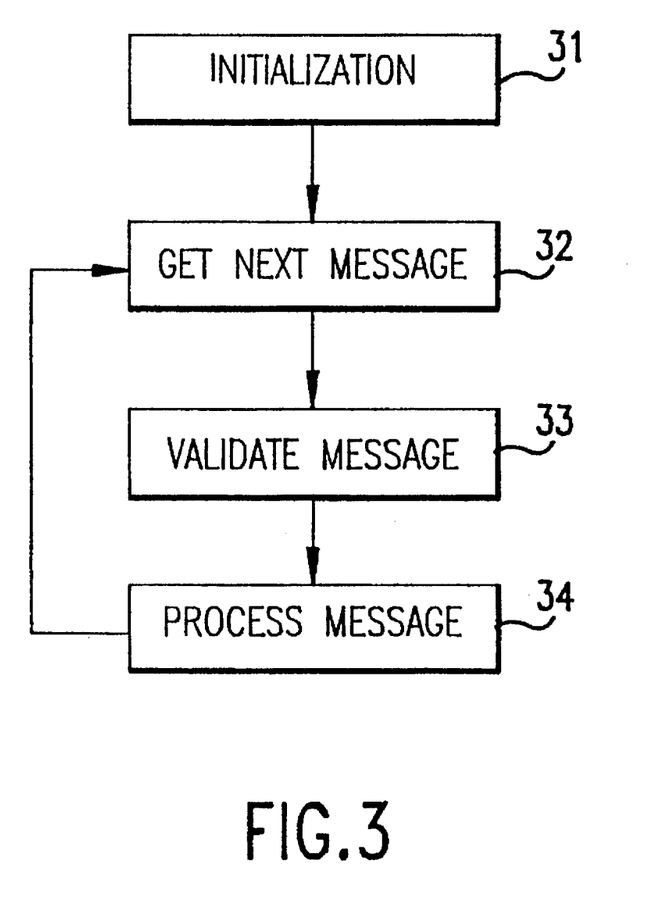
FIG. 3 is a block diagram of the main logical flow of the computer program used in the embodiment.

FIG. 3 illustrates the main logical flow of the program carried out by the communication module 21. After initialization 31, the program gets the next message from any processes, and, in particular, from any software products that may be invoked from the node on which the program is running. Next the message is validated (item 33), and then the message is processed (item 34). After processing of the current message, the program loops to seek the next message again.

Figure 4:
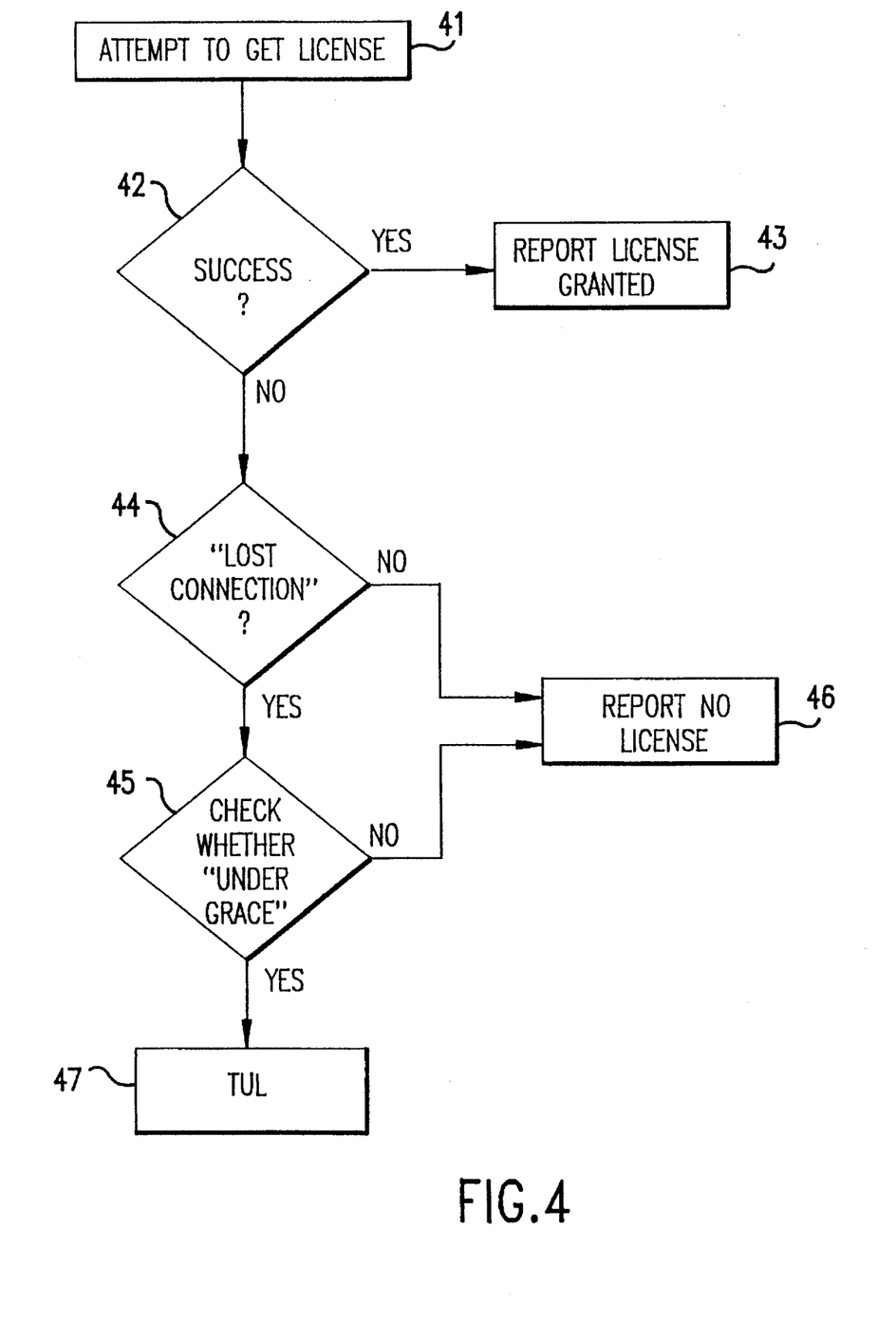
FIG. 4 is a block diagram of the main processing of a validated "get license" message.

The most important message is "get_license", and this message is processed as shown in FIG. 4. The first step 41 is to determine the availability of a license. The license availability determination is made in the licensing dispatch module 22.

After the license availability determination is made as shown in step 41 of FIG. 4, if a license is granted, that fact is reported to the software product in step 43. If the license is not granted because of a lost connection to the server running the Licensing System (determination in step 44), there is a check to see if usage of the software product is possible "under grace", that is whether there has been sufficient recent licensed usage of the software product at the node to permit granting of a TUL. If so, a TUL is granted (step 47). If not, or if the license was denied for reasons other than a lost connection, the program communicates (step 46) the fact of no license availability to the software product.

Additionally, the communication module of the policy server daemon may reserve a predetermined time interval over which the applicable node has a guaranteed opportunity to utilize a given software product. The reservation is accomplished by having the module communicate to the license server over the predetermined time interval that the node is using the given software product, regardless whether the software product is actually being used.

Figure 5:
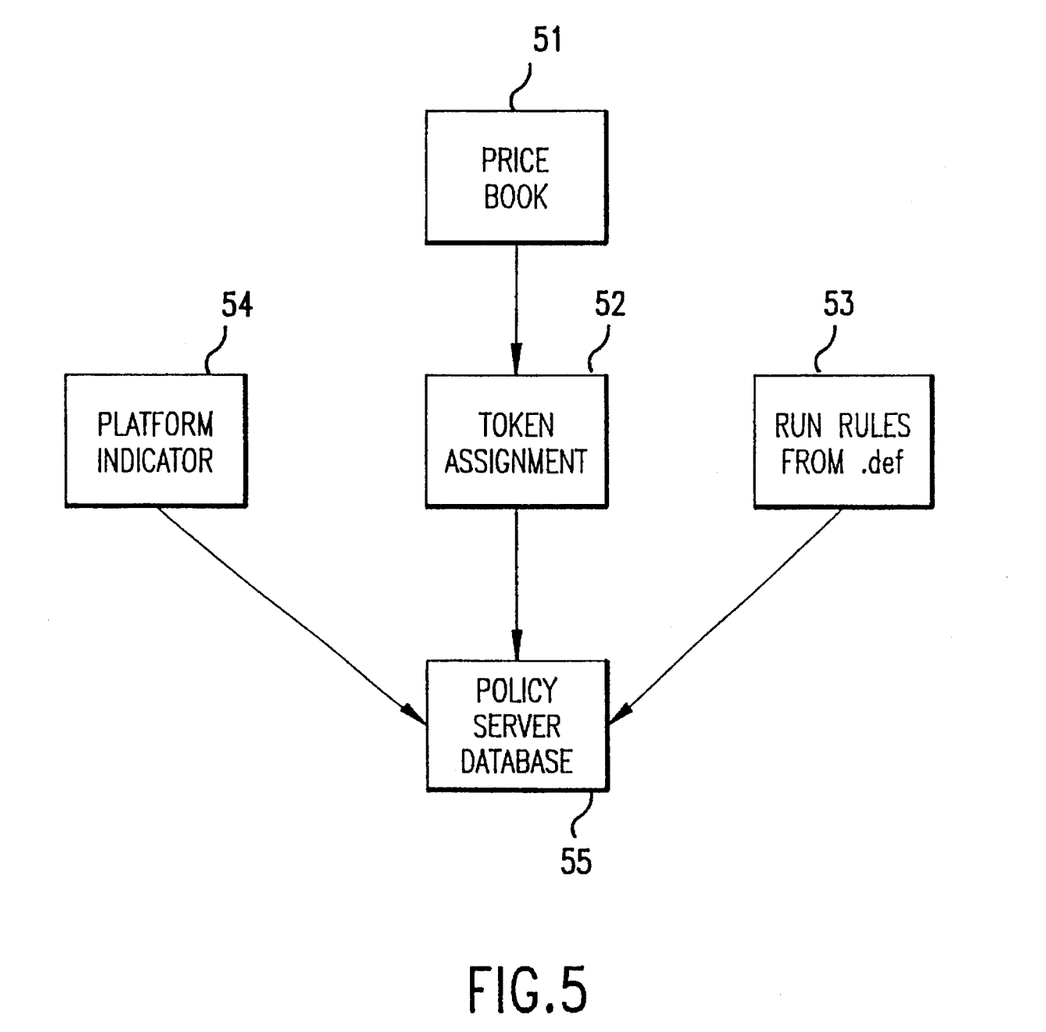
FIG. 5 is a block diagram of the manner in which the policy server database is structured.

The construction of the policy server database is shown in FIG. 5. License prices are initially established by management decision in price book 51, which forms the basis for assigning token values (step 52) required for license grant. The license cost to use a software product can also vary as a function of the hardware platform (i.e., the model of the computer) on which the product is running. Accordingly, the platform indicator data 54 and the rules defining the different types of licenses 53 all form a part of the structure of the policy server database 55. In order to assure integrity of the database, it is encrypted.

Figure 6:
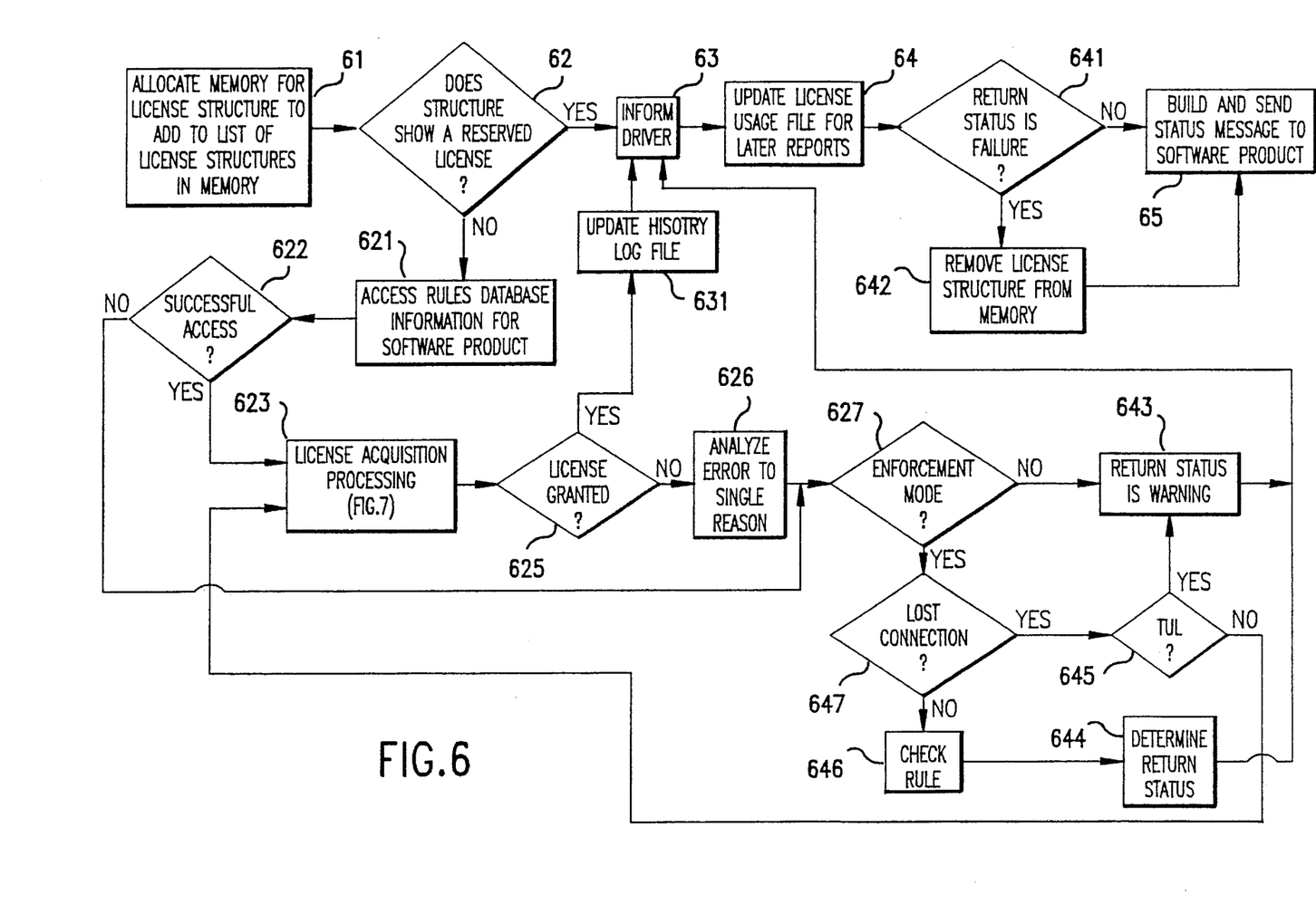
FIG. 6 is a block diagram providing more detail than FIG. 4 of the logical flow of the processing of a "get license" message.

FIG. 6 is a block diagram providing more detail than FIG. 4 of the logical flow of the processing of a "get license" message. Initially (step 61), memory is allocated for the structure of the applicable license to be added to the list of license structures in memory. Unless the structure shows a reserved license (tested in block 62), the policy server database file 14 of FIGS. 1 and 2 is accessed (step 621) to determine the applicable license terms. If access is successful (tested in block 622), then license acquisition processing (described in connection with FIG. 7) follows (step 623).

If, as a result of license acquisition processing, a license is granted (tested in block 625), the history log file 15 of FIGS. 1 and 2 is then updated (step 631) to reflect this event. Thereafter, the policy server driver 291 of FIG. 2 is informed (step 63), the license usage file 281 of FIG. 2 is updated for use in generating later reports (step 64), the return status the operation is checked (step 641), and a status message is built and sent (step 65) to the software product that had included the "get license" call. If the return status is a failure (tested in step 641), the license structure is removed from memory (step 642) before sending the the status message to the software product.

If, as a result of the license acquisition processing of step 623, a license has not been granted, the error messages produced by the Licensing System are analyzed to a single reason (step 626), and the return status for the software product is determined. If the embodiment described herein is not in the enforcement mode (determined in step 627), then the return status is simply a warning (generated in step 643). If the embodiment is in the enforcement mode, there is a check (step 647) to determine if the connection with the license server is lost. If there is no lost connection, the policy server database file 14 is checked (step 646) for the appropriate license failure conditions, and then the return status is determined (step 644). If there is a lost connection, processing follows (step 645), to determine on the basis of the history log file 15 and data in the policy server database file 14 whether a TUL is available. If a TUL is available, the return status is a warning (step 643), as in the case when the system is not in the enforcement mode. Once the return status has been determined, processing is the same as if a license has been granted; that is, the driver is informed, the license usage file is updated, the return status is checked and if necessary the license structure is removed from memory, and the appropriate status message is built and sent to the software product (steps 63, 64, 641, 642, and 65).

If after the determination (step 647) that there is a lost connection, and a TUL is not available (step 645), processing loops back to license acquistion processing (step 623) to attempt again to get a license from the license server. If the policy server database file 14 cannot be successfully accessed in step 621 to determine the relevant license rules (a matter checked in step 622), the processing goes to determine (in step 627) whether the system is in the enforcement mode and to generate an appropriate return status. If in step 62, the license structure shows a reserved license, access to the policy server database file 14 is skipped altogether, and the driver is informed (step 63) directly.

Figure 7:
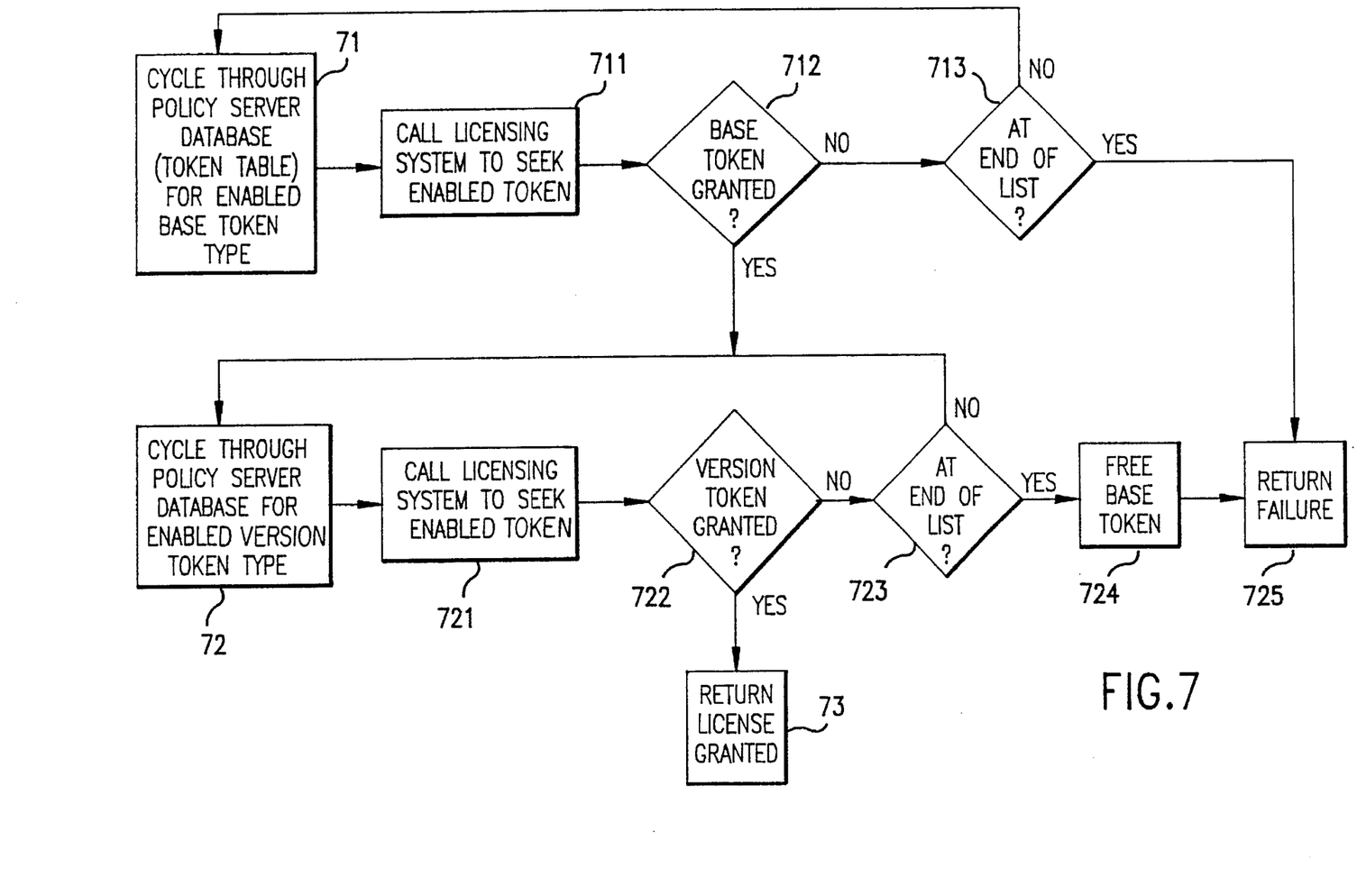
FIG. 7 is a block diagram of license acquisition processing referred to as item 623 in FIG. 6.

FIG. 7 is a block diagram of the license acquisition processing referred to as item 623 in FIG. 6. In accordance with this processing, there is first sought a "base" license token and then a "version" license token, where "base" and "version" have the meanings described above following the description of FIG. 1. Initially, the policy server database file 14 is cycled through to determine the enabled base token type (step 71)—for example node-locked, or concurrent access, or use once. The Licensing System on the server is then called (step 711) to seek the designated enabled token. If the base token is granted (checked at step 712), the policy server database file 14 is then cycled through to determine the enabled version token type (step 72). If the version token is granted (checked at step 722), the return is "license granted" (step 73). In each case if processing through the policy server database is not complete (checked for, in the case of the base token at step 713 and in the case of the version token at steop 723), the database in cycled through again, the Licensing System is called to seek an enabled token, and there is a test to see if the token is granted. If the end of the list has been reached (tested at step 713 for the base token and 723 for the version token) and the applicable token has not been obtained, a failure is returned (step 725). If the base token has been granted, but the version token denied, then the base token is first freed (step 724) before the failure is returned in step 725.

Figure 8:
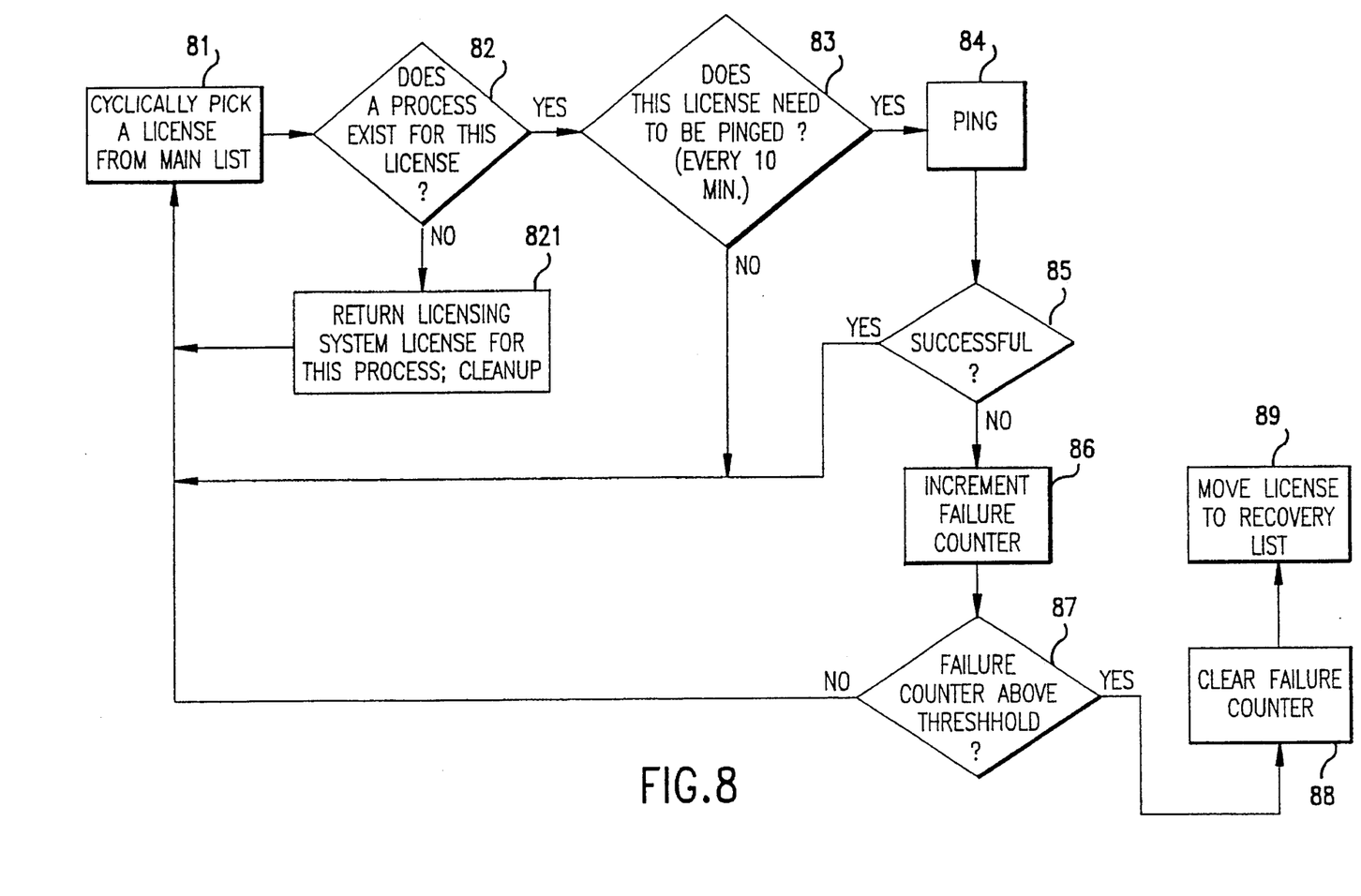
FIG. 8 is a block diagram of clock message processing for licenses on the main list of licenses that have been established.

FIG. 8 is a block diagram of clock message processing for licenses on the main list of licenses that have been established. First, a license is picked as part of a cycle through the main list of licenses in memory (step 81). Next there is a check whether a process exists for this license (step 82). If there is no process, the license is returned to the Licensing System, and associated housekeeping is done (step 821), and the program then picks the next license (step 81) to begin processing again. If it is determined that there is a process, then it is determined whether the license needs to be "pinged" to satisfy requirements of the Licensing System to keep the license (step 83). The implementation here generates a ping every 10 minutes. If no ping is currently necessary, the program again picks the next license (step 81) to begin processing again. If a ping is necessary, it is sent (step 84), and if successful (i.e., the Licensing System reports that the license is still valid (tested in step 85), the program again picks the next license (step 81) to begin processing again.

If the ping is unsuccessful, a failure counter is incremented (step 86), and there is a test (step 87) to determine if the failure counter is above an established threshhold. If it is, then the failure counter is cleared (step 88) and the license in question is moved to the recovery list (step 89). If it is not, then the program again picks the next license (step 81) to begin processing again.

Figure 9:
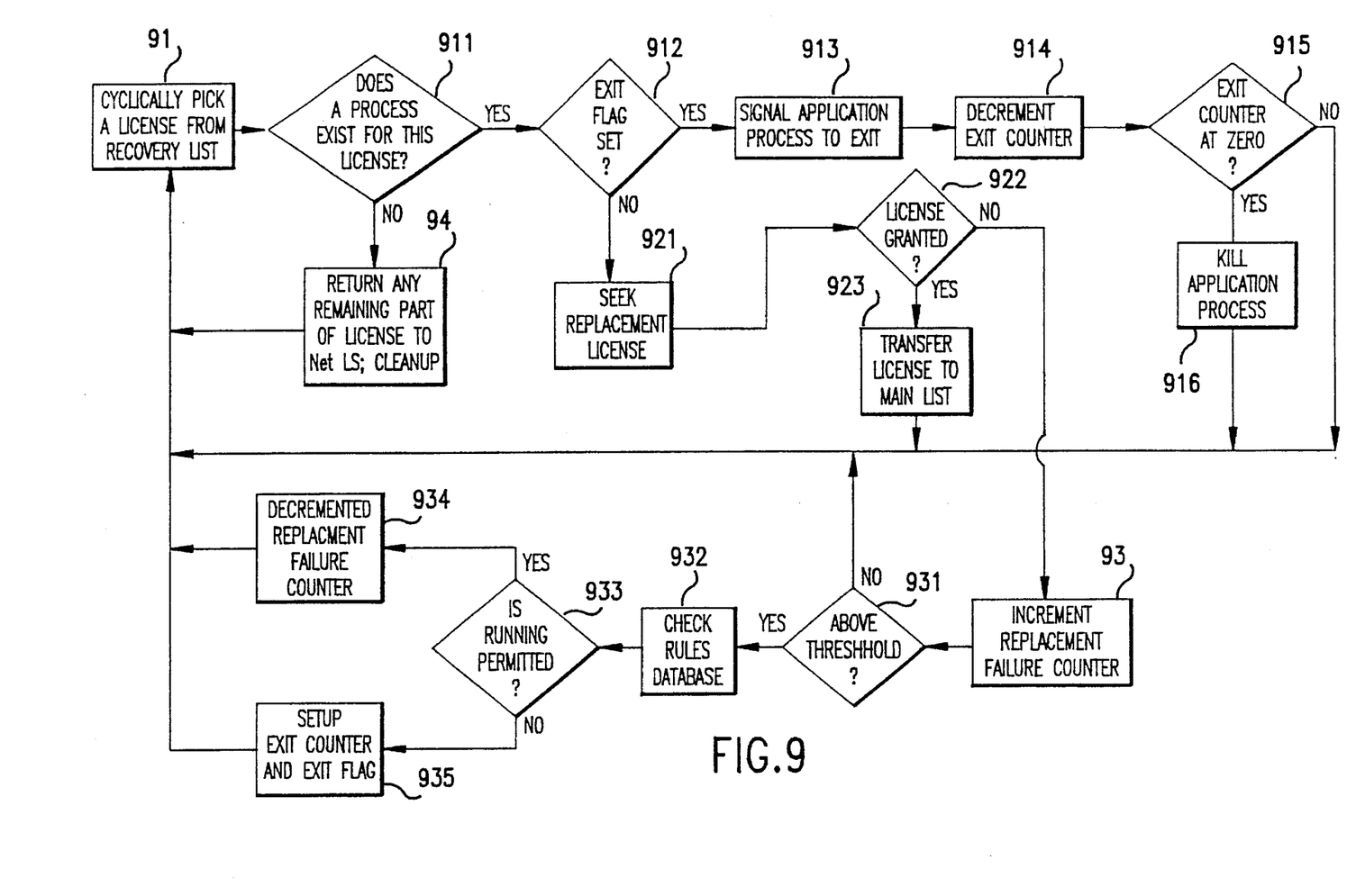
FIG. 9 is a block diagram of clock message processing for licenses moved to the recovery list by item 88 of FIG. 8.

FIG. 9 is a block diagram of clock message processing for licenses moved to the recovery list in step 89 of FIG. 8. First, a license is picked as part of a cycle through the recovery list of licenses in memory (step 91). Next there is a check whether a process exists for this license (step 911). If there is no process, any remaining part of the license is returned to the Licensing System, and associated housekeeping is done (step 94), and the program then picks the next license (step 91) to begin processing again. A check (in step 912) is made to determine whether the exit flag had been set in step 935, and if so, the process of the software product (application) is signalled to exit (step 913), the exit counter is decremented (step 914), and a test (step 915) is made to determine if the exit counter has reached zero. If so, the application process is killed (step 916). In either event, the next license is picked from the recovery list (91), and processing for the next license resumes as before.

If the exit flag had not been set, then a replacement license is sought (step 921), and a test (922) is made to determine whether a license has been granted. If a replacement license has been granted, then If a replacement license has not been granted, the replacement failure counter is incremented (step 93) and then tested (step 931) to determine if it is above a threshhold (here typically 3). If it is not above the threshhold, then the next license is picked from the recovery list (91), and processing for the next license resumes as before. If it is above the threshhold, the polciy server database file 14 is consulted (step 932) to determine whether running of the software product is permitted (step 933). If not, then the exit counter and exit flag are set up; if running is permitted, the replacement failure counter is decremented (step 934). In either case, the next license is picked from the recovery list (91), and processing for the next license resumes as before.

Many other implementations of the invention described herein are possible. For example, the particular types of licenses described here are merely examples. The use of base and version licenses are thus a matter of design choice. The manner in which the failure to obtain a license is handled can also be tailored to suit the policies of the licensor of the software products in question.

What is claimed is:

1. An improved system, operative on a computer having a plurality of digital computers, each computer at a node, in communication with each other over a data path, for administration of license terms for use on the network of a software product with respect to the running of which on nodes of the network a number of licenses have been made available and each of a set of nodes may be caused to seek a license to run the software product, the system being of a type having usage tracking means, associated with one of the computers acting as a license server, for (i) causing storage of the number of licenses available for running the software product on nodes of the network, (ii) identifying the current set of nodes with respect to which a license has been granted to run the software product at a given time, and (iii) determining whether at any given time any licenses remain to be granted for permitting an additional node to run the software product, so that the software product may include instructions to cause enforcement of the license terms;

wherein the improvement comprises:

(a) a policy server database containing data specifying conditions under which usage of the software product is permitted on any given node; and (b) policy server means, maintained and operating locally as an independent process; from the software product, on each computer, with respect to which the license terms are to be enforced, in association with the policy server database, for (i) communicating with the license server, (ii) interfacing with both the software product and the policy server database, and (iii) making a permission-to-run availability determination, with respect to local usage of the software product, on the basis of applicable data from the license server and the policy server database, so that enforcement of license terms applicable to the software product at a given local node is achieved on the basis of both license policy maintained in the policy server database as well as applicable data from the license server.

2. A system according to claim 1, wherein the policy server database is encrypted.

3. A system according to claim 1, wherein each computer at a specified node with respect to which license terms are to be enforced includes means for maintaining locally a local policy server database, containing data specifying conditions under which usage of the software product is permitted on the specified node.

4. A system according to claim 3, wherein (i) each local policy server database contains data specifying conditions under which usage of each of plurality of software products is permitted on the computer on which the database is maintained, and (ii) each policy server means includes means for interfacing with each of the software products, so that enforcement of license terms applicable to each software product at a given local node may be achieved on the basis of both license policy maintained at the local node as well as applicable data from the license server.

5. A system according to claim 4, wherein the policy server means include means for maintaining a secure interface with each of the software products.

6. A system according to claim 4, wherein one of the local policy server databases includes a limit on the number of nodes that may simultaneously use a given software product and wherein the corresponding policy server means associated with the policy server database includes reservation means for informing the license server, over a predetermined time interval, that the node associated with the policy server means is using the given software product, regardless whether the software product is actually being used, so that the node will always be available to use the software product, despite attempts to use the software product at other nodes which if successful would otherwise foreclose use at the node of the software product, with the effect that the reservation means reserves use of the software product at the node over the predetermined time interval.

7. A system according to claim 4, further comprising:

(c) log means, maintained locally in association with each policy server means, for recording and maintaining a log file of recent software product usage on the computer on which the log means is maintained, the log file being accessible to the policy server means, and wherein the policy server means includes means for making a permission-to-run availability determination in the absence of data from the license server on the basis of data from the local policy server database and the log file, so that a favorable determination is possible if the log file indicates a sufficient level of recent usage of the pertinent software product on the computer on which the policy server means is operating.

8. A system according to claim 7, wherein one of the local policy server databases includes a limit on the number of nodes that may simultaneously use a given software product and wherein the corresponding policy server means associated with the policy server database includes reservation means for informing the license server, over a predetermined time interval, that the node associated with the policy server means is using the software product regardless of whether the software product is actually being used, so that the node will always be available to use the software product despite attempts to use the software product at other nodes which if successful would otherwise foreclose use at the node of the software product, with the effect that the reservation means reserve use of the software product at the node over the predetermined time interval.

9. A system according to claim 7, wherein the local policy server database and the log file are encrypted.

10. A system according to claim 9, wherein the policy server means includes means for maintaining a secure interface with each of the software products.

11. A system according to claim 10, wherein one of the local policy server databases includes a limit on the number of nodes that may simultaneously use a given software product and wherein the corresponding policy server means associated with the local policy server database includes reservation means for informing the license server, over a predetermined time interval, that the node associated with the policy server means is using the given software product, regardless whether the software product is actually being used, so that the node will always be available to use the software product, despite attempts to use the software product at other nodes which if successful would otherwise foreclose use at the node of the software product, with the effect that node of the reservation means reserves use of the software product at the node over the predetermined time interval.

12. A computer network, permitting administration of license terms for use on the network of a software product, the network comprising:

(a) a plurality of digital computers, each computer at a node, in communication with each other over a data path, wherein with respect to the running of the software product on nodes of the network a number of licenses have been made available and each of a set of nodes may be caused to seek a license to run the software product; and (b) usage tracking means, associated with one of the computers acting as a license server, for (i) causing storage of the number of licenses available for running the software product on nodes of the data path, (ii) identifying the current set of nodes with respect to which a license has been granted to run the software product at a given time, and (iii) determining whether at any given time any licenses remain to be granted for permitting an additional node to run the software product; and (c) a policy server database, maintained locally on each computer with respect to which it is desired to enforce license terms applicable to usage of the software product, containing data specifying conditions under which usage of the software product is permitted on each computer on which the database is maintained; and (d) policy server means, maintained and operating locally as an independent process separate from the software product, on each computer with respect to which it is desired to enforce license terms applicable to usage of the software product, and in association with the corresponding policy server database, for (i) communicating with the license server, (ii) interfacing with both (aa) the software product and (bb) the corresponding policy server database, and (iii) making a permission-to-run availability determination, with respect to local usage of the software product, on the basis of applicable data from the license server and the corresponding policy server database, so that enforcement of license terms applicable to the software product at a given node is achieved on the basis of license policy maintained locally at the given node as well as applicable data from the license server.

13. A computer network according to claim 12, wherein the policy server means includes means for maintaining a secure interface with each of the software products.

14. A computer network according to claim 12, further comprising:

(e) log means, maintained locally in association with each policy server means, for recording and maintaining a log file of recent software product usage on the computer on which the log means is maintained, the log file being accessible to the policy server means, and wherein the policy server means includes means for making a permission-to-run availability determination in the absence of data from the license server on the basis of data from the policy server database and the log file, so that a favorable determination is possible if the log file indicates a sufficient level of recent usage of the pertinent software product on the computer on which the policy server means is operating.

15. A computer network according to claim 14, wherein the policy server database and the log file are encrypted.

16. A computer network according to claim 15, wherein the policy server means includes means for maintaining a secure interface with each of the software products.

17. An improved system operative on a computer network having a plurality of digital computers, each computer at a node, in communication with each other over a data path, for administration of license terms for use on the network of a software product with respect to the running of which on nodes of the network a number of licenses have been made available and each of a set of nodes may be caused to seek a license to run the software product, the system being of a type having usage tracking means, associated with one of the computers acting as a license server, for (i) causing storage of the number of licenses available for running the software product on nodes of the network, (ii) identifying the current set of nodes with respect to which a license has been granted to run the software product at a given time, and (iii) determining whether at any given time any licenses remain to be granted for permitting an additional node to run the software product, so that the software product may include instructions to cause enforcement of the license terms;

wherein the improvement comprises:

(a) a policy server database containing data specifying conditions under which usage of the software product is permitted on any given node; and (b) policy server means, maintained and operating locally as an independent process, separate from the software product, on each computer, with respect to which the license terms are to be enforced, in association with the policy server database, for (i) communicating with the license server, (ii) interfacing with both the software product and the policy server database, and (iii) making a permission-to-run availability determination, with respect to local usage of the software product, on the basis of applicable data from the license server and the policy server database, so that enforcement of license terms applicable to the software product at a given local node is achieved on the basis of both license policy maintained in the policy server database as well as applicable data from the license server; and (c) log means for recording and maintaining a log file of recent software product usage on each computer at a node with respect to which license terms are to be enforced, the log file being accessible to the policy server means, and wherein the policy server means includes means for making a permission-to-run availability determination in the absence of data from the license server on the basis of data from the policy server database and the log file, so that a favorable determination is possible if the log file indicates a sufficient level of recent usage of the pertinent software product on the computer on which the policy server means is operating.

18. A digital storage medium encoded with instructions for a given computer on a computer network, the instructions causing administration of license terms for use on the network of a software product, the network of a type having:

(i) a plurality of digital computers, each computer at a node, in communication with each other over a data path, wherein with respect to the running of the software product on nodes of the network a number of licenses have been made available and each of a set of nodes may be caused to seek a license to run the software product;

(ii) usage tracking means, associated with one of the computers acting as a license server, for (i) causing storage of the number of licenses available for running the software product on nodes of the network, (ii) identifying the current set of nodes with respect to which a license has been granted to run the software product at a given time, and (iii) determining whether at any given time any licenses remain to be granted for permitting an additional node to run the software product, the instructions when loaded into the given computer establishing:

(a) data structure for a policy server database, maintained locally on the given computer, containing data specifying conditions under which usage of the software product is permitted on the given computer; and (b) policy server means, maintained and operating totally, as an independent process, separate from the software product on the given computer, and in association with the policy server database, for (i) communicating with the license server, (ii) interfacing with both (aa) the software product and (bb) the policy server database, and (iii) making a permission-to-run availability determination, with respect to local usage of the software product, on the basis of applicable data from the license server and the policy server database, so that enforcement of license terms applicable to the software product at the given computer is achieved on the basis of license policy maintained at the given computer as well as applicable data from the license server.

* * * * *

UNITED STATES PATENT AND TRADEMARK OFFICE
CERTIFICATE OF CORRECTION

PATENT NO. : 5,579,222

DATED : November 26, 1996

INVENTOR(S) : Jeffrey E. Bains
Willard W. Case

It is certified that error appears in the above-identified patent and that said Letters Patent is hereby corrected as shown below:

Col. 11, ln. 5, after "process" delete ";" and insert --, separate-- after "process"
Col. 12, ln. 38, delete "node of"
Col. 14, ln. 50, change "totally" to --locally--

Signed and Sealed this

Eighteenth Day of March, 1997

Attest:

BRUCE LEHMAN

Attesting Officer

Commissioner of Patents and Trademarks